United States Patent [19]

Lobner

[11] Patent Number: 5,649,337
[45] Date of Patent: Jul. 22, 1997

[54] HEATED WINDSHIELD WIPER BLADE

[76] Inventor: Anthony R. Lobner, P.O. Box 520171, Big Lake, Ala. 99652

[21] Appl. No.: 565,811

[22] Filed: Nov. 30, 1995

[51] Int. Cl.$^6$ ................................ B60S 1/04; B60S 1/38
[52] U.S. Cl. ........................ 15/250.06; 15/250.48; 219/202
[58] Field of Search ............... 15/250.05, 250.06, 15/250.07, 250.08, 250.09, 248, 250.361; 219/202, 203

[56] References Cited

U.S. PATENT DOCUMENTS

| 2,550,504 | 4/1951 | Vidrick et al. | 15/250.06 |
|---|---|---|---|
| 2,903,732 | 9/1959 | Taylor et al. | 15/250.06 |
| 3,639,938 | 2/1972 | Golden | 15/250.06 |
| 3,667,183 | 6/1972 | Linker | 15/250.06 |
| 4,360,941 | 11/1982 | Mabie | 15/250.06 |
| 4,387,290 | 6/1983 | Yasuda | 15/250.07 |
| 4,603,451 | 8/1986 | Van Sickle | 15/250.07 |
| 4,670,933 | 6/1987 | Toplensky | 15/250.07 |
| 5,325,561 | 7/1994 | Kotler | 15/250.06 |

FOREIGN PATENT DOCUMENTS

| 918312 | 9/1954 | Germany | 15/250.06 |
|---|---|---|---|
| 291252 | 12/1986 | Japan | 15/250.06 |

Primary Examiner—Gary K. Graham

[57] ABSTRACT

A heated windshield wiper blade including an elongated heated wiper blade having an arm portion pivotally secured to a central portion thereof. The arm portion has a distal end rotatably coupled with an automobile adjacent to a windshield thereof. A temperature sensor is secured to the arm portion of the elongated blade portion. The temperature sensor is electrically coupled with the heated wiper blade. An on/off switch is secured to a dashboard of an automobile. The on/off switch is electrically coupled with the temperature sensor.

1 Claim, 3 Drawing Sheets

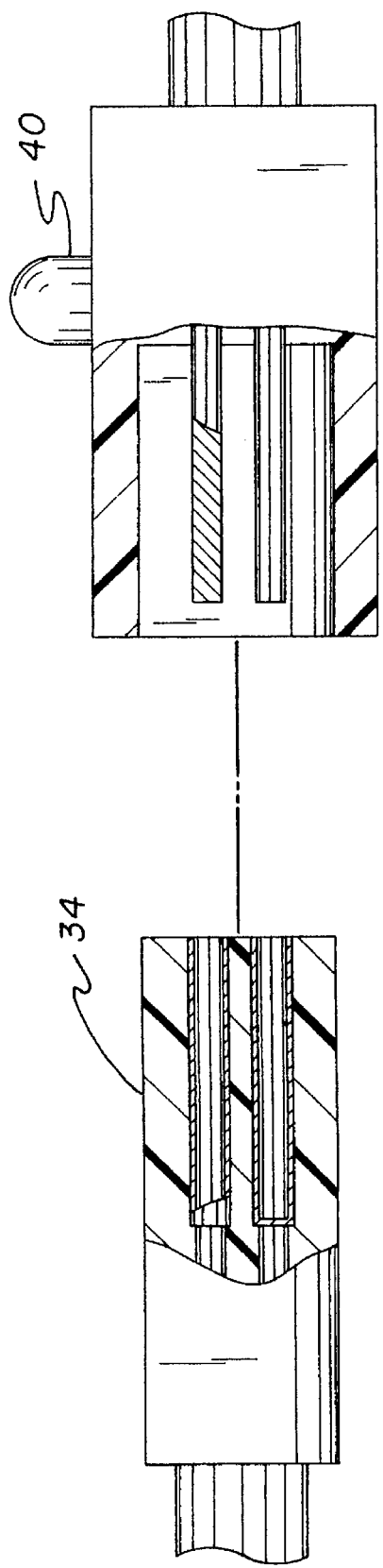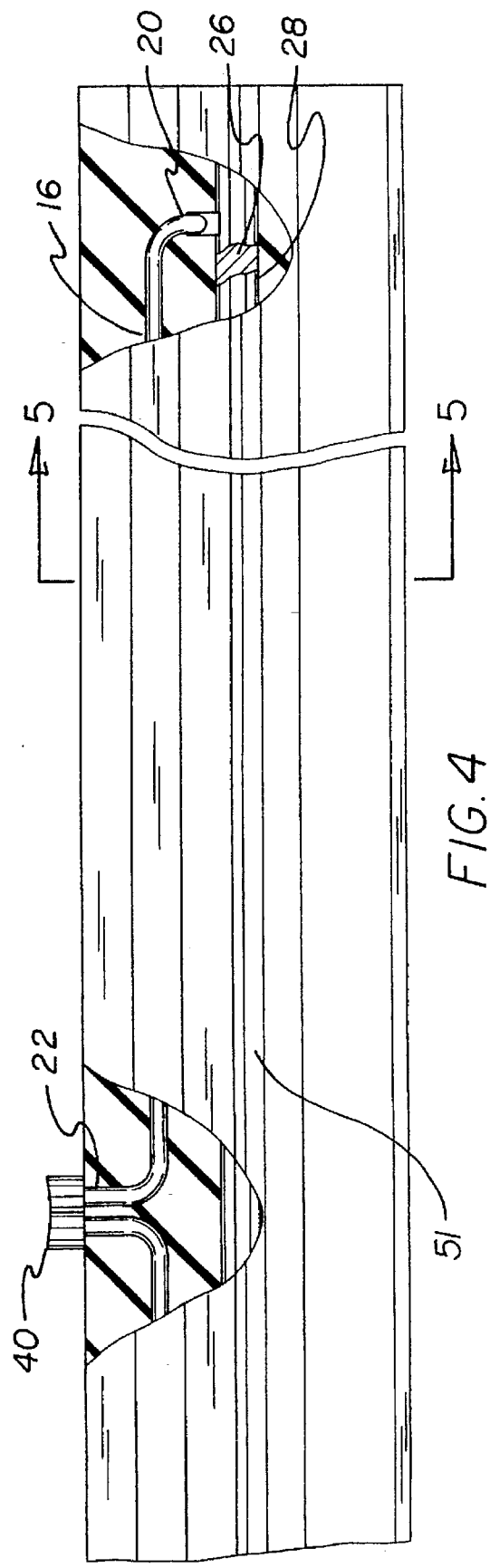

HEATED WINDSHIELD WIPER BLADE

BACKGROUND OF THE INVENTION

1. Field of the Invention

The present invention relates to a heated windshield wiper blade and more particularly pertains to automatically activating to melt snow and ice on a windshield with a heated windshield wiper blade.

2. Description of the Prior Art

The use of heated wiper blades is known in the prior art. More specifically, heated wiper blades heretofore devised and utilized for the purpose of enhancing removal of ice and snow are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,325,561 to Kotlar discloses a heated flexible windshield wiper.

U.S. Pat. No. 4,360,941 to Mabie discloses an electrically heated windshield wiper assembly.

U.S. Pat. No. Des. 341,115 to Papania discloses the ornamental design for a heated windshield wiper.

U.S. Pat. No. 4,670,933 to Toplenszky discloses a heated windshield wiper.

U.S. Pat. No. 4,928,345 to Meltzer et al. discloses a heated windshield wiper blade and holder.

U.S. Pat. No. 3,530,525 to Abel discloses a heated windshield wiper.

U.S. Pat. No. Des. 324,014 to Ruminer discloses the ornamental design for a heated windshield wiper.

While these devices fulfill their respective, particular objective and requirements, the aforementioned patents do not describe a heated windshield wiper blade for automatically activating to melt snow and ice on a windshield.

In this respect, the heated windshield wiper blade according to the present invention substantially departs from the conventional concepts and designs of the prior art, and in doing so provides an apparatus primarily developed for the purpose of automatically activating to melt snow and ice on a windshield.

Therefore, it can be appreciated that there exists a continuing need for new and improved heated windshield wiper blade which can be used for automatically activating to melt snow and ice on a windshield. In this regard, the present invention substantially fulfills this need.

SUMMARY OF THE INVENTION

In the view of the foregoing disadvantages inherent in the known types of heated wiper blades now present in the prior art, the present invention provides an improved heated windshield wiper blade. As such, the general purpose of the present invention, which will be described subsequently in greater detail, is to provide a new and improved heated windshield wiper blade and method which has all the advantages of the prior art and none of the disadvantages.

To attain this, the present invention essentially comprises an elongated wiper blade having an arm portion pivotally secured to a central portion thereof. The arm portion has a distal end rotatably coupled with an automobile adjacent to a windshield thereof. The wiper blade has a pair of upper channels and a lower channel extending longitudinally therethrough. The pair of upper channels have downturned exterior end portions extending into the lower channel and upturned interior portions extending outwardly of the wiper blade. A heating element is secured within the lower channel of the elongated wiper blade. A temperature sensor is secured to the arm portion of the elongated blade portion. The temperature sensor has first wiring extending outwardly of a first end thereof and second wiring extending outwardly of a second end thereof. The first wiring and the second wiring are electrically coupled together. A power indicator light is secured to the elongated wiper blade. The power indicator light is electrically coupled with the second wiring of the temperature sensor. The power indicating light has wiring extending outwardly thereof into the upturned interior end portions of the pair of upper channels and extend through the downturned exterior end portions of the wiper blade to electrically couple with the heating element within the lower channel. An on/off switch is secured to a dashboard of an automobile and coupled with a power supply thereof. The on/off switch is electrically coupled with the first wiring of the temperature sensor.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved heated windshield wiper blade which has all the advantages of the prior art heated wiper blades and none of the disadvantages.

It is another object of the present invention to provide a new and improved heated windshield wiper blade which may be easily and efficiently manufactured and marketed.

It is a further object of the present invention to provide a new and improved heated windshield wiper blade which is of durable and reliable construction.

An even further object of the present invention is to provide a new and improved heated windshield wiper blade which is susceptible of a low cost of manufacture with regard to both materials and labor, and which accordingly is then susceptible of low prices of sale to the consuming public, thereby making such a heated windshield wiper blade economically available to the buying public.

Still yet another object of the present invention is to provide a new and improved heated windshield wiper blade which provides in the apparatuses and methods of the prior art some of the advantages thereof, while simultaneously overcoming some of the disadvantages normally associated therewith.

Even still another object of the present invention is to provide a new and improved heated windshield wiper blade for automatically activating to melt snow and ice on a windshield.

Lastly, it is an object of the present invention to provide a new and improved heated windshield wiper blade including an elongated heated wiper blade having an arm portion pivotally secured to a central portion thereof. The arm portion has a distal end rotatably coupled with an automobile adjacent to a windshield thereof. A temperature sensor is secured to the arm portion of the elongated blade portion. The temperature sensor is electrically coupled with the heated wiper blade. An on/off switch is secured to a dashboard of an automobile. The on/off switch is electrically coupled with the temperature sensor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side cross-sectional view of the power indicator light connected with the heating element.

FIG. 4 is a side view of the wiper blade of the present invention.

The same reference numerals refer to the same parts through the various Figures.

DESCRIPTION OF THE PREFERRED EMBODIMENT

Figures 1A, 1B:
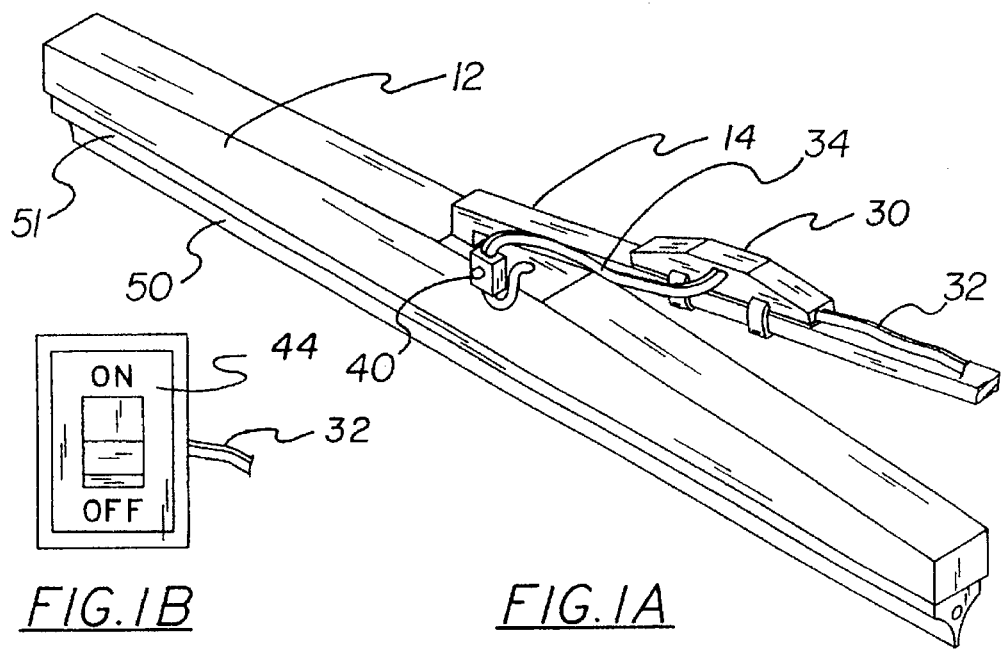
FIG. 1 is a perspective view of the preferred embodiment of the heated windshield wiper blade constructed in accordance with the principles of the present invention.
Figure 2:
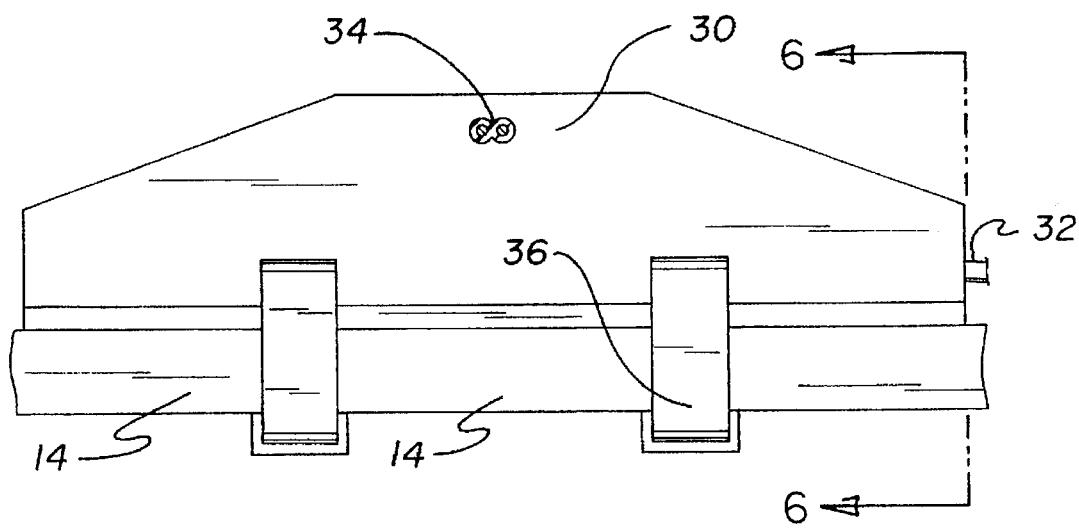
FIG. 2 is a front elevation view of the temperature sensor of the present invention.
Figure 5:
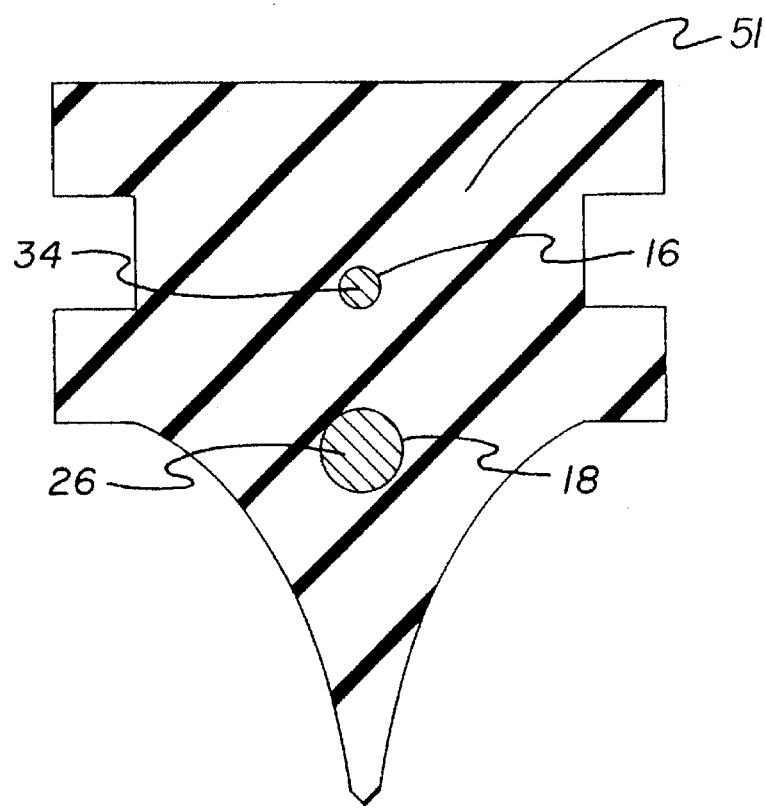
FIG. 5 is a cross-sectional view of the present invention as taken along line 5—5 of FIG. 4.
Figure 6:
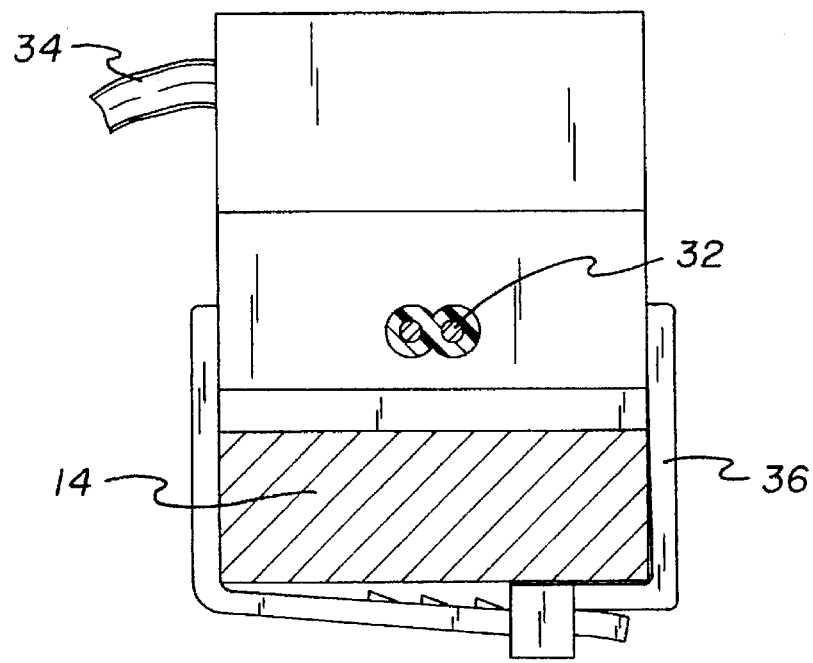
FIG. 6 is a cross-sectional view as taken along line 6—6 of FIG. 2.

With reference now to the drawings, and in particular, to FIGS. 1–6 thereof, the preferred embodiment of the new and improved heated windshield wiper device embodying the principles and concepts of the present invention and generally designated by the reference number 10 will be described.

Specifically, it will be noted in the various Figures that the device relates to a new and improved heated windshield wiper blade for automatically activating to melt snow and ice on a windshield. In its broadest context, the device consists of an elongated wiper blade, a heating element, a temperature sensor, a power indicator light, and an on/off switch. Such components are individually configured and correlated with respect to each other so as to attain the desired objective.

The windshield wiper device 10 includes an elongated wiper blade 12 having an arm portion 14 pivotally secured to a central portion thereof. The wiper blade 12 includes a housing portion 50 and a blade portion 51. The arm portion 14 has a distal end rotatably coupled with an automobile adjacent to a windshield thereof. The blade portion 51 has a pair of upper channels 16 and a lower channel 18 extending longitudinally therethrough. The pair of upper channels 16 have downturned exterior end portions 20 extending into the lower channel 18 and upturned interior portions 22 extending outwardly of the blade portion 51.

A heating element 26 is secured within the lower channel 18 of the elongated blade portion 51. The heating element 26 extends the entire length of the lower channel 18 to evenly distribute heat throughout the wiper blade 12.

A temperature sensor 30 is secured to the arm portion 14 of the device 10. The temperature sensor 30 has first wiring 32 extending outwardly of a first end thereof and second wiring 34 extending outwardly of a second end thereof. The first wiring 32 and the second wiring 34 are electrically coupled together within the temperature sensor 30. The temperature sensor 30 has a pair of securement straps 36 extending outwardly of a lower end portion thereof for removable coupling with the arm portion 14 of the device 10. The temperature sensor 30 will automatically activate or deactivate the heating element 26 when the temperature falls or rises beyond pre-set limits.

A power indicator light 40 is secured to the elongated wiper blade 12. The power indicator light 40 is electrically coupled with the second wiring 34 of the temperature sensor 30. The power indicating light 40 has the second wiring 34 extending outwardly thereof into the upturned interior end portions 22 of the pair of upper channels 16 and extends through the downturned exterior end portions 20 of the blade portion 51 to electrically couple with the heating element 26 within the lower channel 18. The power indicator light 40 provides visual indication of when the heating element 26 has been activated.

Lastly, an on/off switch 44 is secured to a dashboard of an automobile and coupled with a power supply thereof. The on/off switch 44 is electrically coupled with the first wiring 32 of the temperature sensor 30. The on/off switch 44 is used to activate the wiper blade 12. When the temperature sensor 30 activates the heating element 26, the wiper blade 12 will warm up, and ice and snow will be dislodged from it. The wiping edge of the wiper blade 12 can then work effectively to clear the windshield surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A heated windshield wiper device for automatically activating to melt snow and ice on a windshield comprising, in combination:

an elongated wiper blade comprised of a blade portion and a housing portion, the blade portion being in direct contact with a windshield, the housing portion having an arm portion pivotally secured to a central portion thereof, the arm portion having a free end for rotatably coupling with an automobile adjacent to a windshield thereof, the blade portion having a pair of upper channels and a lower channel extending longitudinally therethrough, the pair of upper channels having downturned outer end portions extending into the lower channel and upturned inner portions extending outwardly of the blade portion;

a heating element secured within the lower channel of the blade portion of the elongated wiper blade;

a temperature sensor secured to the arm portion of the elongated wiper blade, the temperature sensor having first wiring extending outwardly of a first end thereof and second wiring extending outwardly of a second end thereof, the first wiring and the second wiring being electrically coupled together;

a power indicator light secured to the housing portion of the elongated wiper blade, the power indicator light being electrically coupled with the second wiring of the temperature sensor, the power indicating light having wiring extending outwardly thereof into the upturned inner end portions of the pair of upper channels of the blade portion and extend through the downturned outer end portions of the blade portion to electrically couple with the heating element within the lower channel;

an on/off switch for securing to a dashboard of an automobile and coupled with a power supply thereof, the on/off switch being electrically coupled with the first wiring of the temperature sensor.

* * * * *